United States Patent
Kuhn et al.

(10) Patent No.: US 11,339,555 B2
(45) Date of Patent: May 24, 2022

(54) METHOD FOR ASCERTAINING THE TARGET ROTATIONAL SPEED OF A DRIVE MACHINE OF A WORK MACHINE COMPRISING A CONTINUOUSLY VARIABLE TRANSMISSION AND A WORKING HYDRAULIC SYSTEM

(71) Applicant: ZF Friedrichshafen AG, Friedrichshafen (DE)

(72) Inventors: Jan-Frederik Kuhn, Friedrichshafen (DE); Stefan Traub, Friedrichshafen (DE); Stephan Schinacher, Egesheim (DE); Marcus Hiemer, Meckenbeuren (DE); Robert Morrison, Tettnang (DE); Jürgen Legner, Friedrichshafen (DE); Sven Bieber, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 225 days.

(21) Appl. No.: 16/491,791

(22) PCT Filed: Jan. 23, 2018

(86) PCT No.: PCT/EP2018/051494
§ 371 (c)(1),
(2) Date: Sep. 6, 2019

(87) PCT Pub. No.: WO2018/162138
PCT Pub. Date: Sep. 13, 2018

(65) Prior Publication Data
US 2020/0190772 A1 Jun. 18, 2020

(30) Foreign Application Priority Data
Mar. 8, 2017 (DE) ...................... 10 2017 203 835.7

(51) Int. Cl.
*E02F 9/22* (2006.01)
*A01B 67/00* (2006.01)
(Continued)

(52) U.S. Cl.
CPC ............ *E02F 9/2246* (2013.01); *A01B 67/00* (2013.01); *B60W 10/06* (2013.01); *F02D 29/02* (2013.01);
(Continued)

(58) Field of Classification Search
CPC ........ F02D 29/02; F02D 29/04; F02D 31/001; F02D 41/0205; F02D 41/021;
(Continued)

(56) References Cited

U.S. PATENT DOCUMENTS 5,612,873 A * 3/1997 Ogawa ................... B60W 10/04
701/51
5,911,506 A * 6/1999 Nakamura ............ E02F 9/2296
37/348

(Continued)

Primary Examiner — John M Zaleskas
(74) Attorney, Agent, or Firm — Finch & Maloney, PLLC; Michael Bujold; Jay Franklin (57) ABSTRACT

A process for determining a setpoint rotational speed of a work machine engine, having a continuously variable transmission, based on operation of power hydraulics. The setpoint rotational speed for highly productive operation is determined, without knowledge current operation of the power hydraulics, by a basic engine speed setting. With knowledge of the current operating state, the setpoint rotational speed is determined by the basic speed settings and low or high engine speed settings. The low speed setting alone determines setpoint rotational speeds that are lower than the basic speed setting or a combination of the low and basic speed settings. The high speed setting alone determines setpoint rotational speeds that are higher than the basic speed setting or a combination of the basic and high speed settings. The speed settings can comprise a setpoint (Continued)

rotational speed range of above a reciprocal transmission range of the variable transmission.

13 Claims, 8 Drawing Sheets

(51) Int. Cl.
| | |
|---|---|
| *B60W 10/06* | (2006.01) |
| *F02D 41/04* | (2006.01) |
| *F02D 29/02* | (2006.01) |
| *F02D 29/04* | (2006.01) |
| *F02D 31/00* | (2006.01) |
| *F02D 41/02* | (2006.01) |
| *F16H 61/465* | (2010.01) |
| *F16H 59/36* | (2006.01) |

(52) U.S. Cl.
CPC ........... *F02D 29/04* (2013.01); *F02D 31/001* (2013.01); *F02D 41/021* (2013.01); *F02D 41/0205* (2013.01); *F02D 41/0225* (2013.01); *F02D 41/04* (2013.01); *B60Y 2200/412* (2013.01); *F02D 2200/101* (2013.01); *F02D 2200/1002* (2013.01); *F02D 2200/602* (2013.01); *F02D 2400/12* (2013.01); *F16H 61/465* (2013.01); *F16H 2059/366* (2013.01)

(58) Field of Classification Search
CPC ................. F02D 41/0225; F02D 41/04; F02D 2200/101; F02D 2400/12; E02F 9/2246; B60W 10/06; B60W 2710/0644; F16H 2059/366; F16H 61/465; B60Y 2200/412; A01B 67/00
See application file for complete search history.

(56) References Cited

U.S. PATENT DOCUMENTS

| | | | | |
|---|---|---|---|---|
| 5,930,996 | A * | 8/1999 | Nakamura | E02F 9/2285 60/426 |
| 6,183,210 | B1 * | 2/2001 | Nakamura | F04B 49/065 417/222.1 |
| 6,234,254 | B1 * | 5/2001 | Dietz | A01B 67/00 172/3 |
| 6,260,440 | B1 * | 7/2001 | Cronin | F16H 47/04 475/76 |
| 6,343,470 | B1 * | 2/2002 | Nanri | F16D 31/02 60/448 |
| 6,347,680 | B1 * | 2/2002 | Mianzo | B60K 28/16 123/350 |
| 6,413,189 | B1 * | 7/2002 | Spiess | B60W 30/18045 477/110 |
| 8,585,543 | B1 * | 11/2013 | Davis | B60W 10/103 477/43 |
| 2002/0073699 | A1 * | 6/2002 | Nishimura | E02F 9/2246 60/325 |
| 2002/0132699 | A1 * | 9/2002 | Bellinger | B60W 10/04 477/107 |
| 2003/0019681 | A1 * | 1/2003 | Nakamura | F15B 11/17 180/307 |
| 2006/0113140 | A1 * | 6/2006 | Nakamura | F02D 29/02 180/306 |
| 2006/0161324 | A1 * | 7/2006 | Ozawa | E02F 9/2235 701/50 |
| 2006/0167607 | A1 * | 7/2006 | Nakamura | B60W 10/04 701/50 |
| 2007/0204604 | A1 * | 9/2007 | Naruse | F04B 17/05 60/433 |
| 2007/0204605 | A1 * | 9/2007 | Itoga | B60W 30/188 60/433 |
| 2008/0202468 | A1 * | 8/2008 | Grill | E02F 9/2235 123/339.14 |
| 2008/0319618 | A1 * | 12/2008 | Sjogren | E02F 9/2246 701/50 |
| 2009/0088936 | A1 * | 4/2009 | Hubbard | B60W 10/101 701/54 |
| 2009/0320461 | A1 * | 12/2009 | Morinaga | B66F 9/22 60/431 |
| 2010/0024412 | A1 * | 2/2010 | Hyodo | B60W 10/30 60/426 |
| 2010/0262353 | A1 * | 10/2010 | Hyodo | B60W 10/06 701/102 |
| 2011/0167811 | A1 * | 7/2011 | Kawaguchi | F02D 41/021 60/395 |
| 2012/0095655 | A1 * | 4/2012 | Hyodo | B60W 10/06 701/50 |
| 2012/0310495 | A1 * | 12/2012 | Nakanishi | E02F 9/2066 701/50 |
| 2013/0041561 | A1 * | 2/2013 | Asami | E02F 9/0841 701/50 |
| 2013/0053215 | A1 * | 2/2013 | Hou | F02D 41/0205 477/37 |
| 2014/0058649 | A1 * | 2/2014 | Miyasaka | F02D 29/04 701/110 |
| 2014/0128187 | A1 * | 5/2014 | Iraha | F16H 9/125 474/8 |
| 2014/0379243 | A1 * | 12/2014 | Hyodo | F02D 41/0215 701/110 |
| 2016/0069282 | A1 * | 3/2016 | Kayane | F15B 11/04 60/431 |
| 2016/0076462 | A1 * | 3/2016 | Hoff | F02D 29/02 477/107 |
| 2016/0237651 | A1 * | 8/2016 | Miyamoto | B60W 10/08 |
| 2016/0347321 | A1 * | 12/2016 | Ge | B60W 10/30 |
| 2017/0088138 | A1 * | 3/2017 | Goli | B60W 30/188 |
| 2017/0203761 | A1 * | 7/2017 | Hiemer | B60W 30/18063 |
| 2017/0284325 | A1 * | 10/2017 | Mei | E02F 9/2066 |
| 2017/0306862 | A1 * | 10/2017 | Waite, III | F02D 31/001 |
| 2017/0361845 | A1 * | 12/2017 | Sharp | B60W 10/10 |
| 2018/0093670 | A1 * | 4/2018 | Sharp | B60W 30/1882 |

* cited by examiner

METHOD FOR ASCERTAINING THE TARGET ROTATIONAL SPEED OF A DRIVE MACHINE OF A WORK MACHINE COMPRISING A CONTINUOUSLY VARIABLE TRANSMISSION AND A WORKING HYDRAULIC SYSTEM

This application is a National Stage completion of PCT/EP2018/051494 filed Jan. 23, 2018, which claims priority from German patent application serial no. 10 2017 203 835.7 filed Mar. 8, 2017.

FIELD OF THE INVENTION

The invention relates to a process for determining a desired rotational speed of a prime mover of a work machine having a continuously variable transmission and having power hydraulics.

BACKGROUND OF THE INVENTION

Known from U.S. Pat. No. 6,234,254 B1 are a device and process for controlling the efficiency of a work cycle of a work machine and for adjusting a rotational speed of a prime mover to vary torque transmitted in the drive train. In this case, first a desired rotational speed is determined as a function of a throttle valve position, of a speed ratio of a torque converter and of further operating variables of the drive train. Subsequently, a control unit determines a position of booms of the work machine, which in this case is designed as a wheel loader, and adjusts the setpoint rotational speed of the prime mover as a function of the position of the booms. In this case, a so-called look-up table is used, in which a plurality of scaling values are stored, which match a multiplicity of angle values of the booms and a bucket operatively connected thereto. The control unit selects a scaling value on the basis of the angle information and multiplies the scaling value by the setpoint rotational speed; this value is then used by the control unit to set the speed of the prime mover as a function of the adjusted setpoint rotational speed.

The disadvantage here is that the operation of various vehicle systems based on the process described takes considerable time and effort. In addition, the proposed approach is only partially suitable for use in machine systems that are designed with a continuously variable transmission.

SUMMARY OF THE INVENTION

The present invention therefore addresses the problem of providing a process for determining a setpoint rotational speed of a prime mover of a work machine for use with a continuously variable transmission and with power hydraulics that can be implemented in various vehicle systems with little effort.

According to the invention, this problem is solved by a process having the features of the independent claim(s).

In the process, according to the invention for determining a setpoint rotational speed of a prime mover of a work machine having a continuously variable transmission and having power hydraulics, as a function of an operating state of the power hydraulics, the setpoint rotational speed is determined without knowledge of the current operating state of the power hydraulics, by means of a basic engine speed setting, which is used to determine setpoint rotational speeds, at which the work machine can be operated at high productivity. This is advantageously the case even if, for instance, the sensors determining the operating state of the power hydraulics are not available due to a failure.

In addition, the setpoint rotational speed of the engine is determined by means of the process according to the invention, if the operating state of the power hydraulics is known, taking into account the basic engine speed settings and at least additionally as a function of a low engine speed setting and a high engine speed setting, wherein the low engine speed setting alone determines lower setpoint rotational speeds than the basic engine speed setting or a combination of the low engine speed setting and the basic engine speed setting. In addition, the setpoint rotational speeds determined solely as a function of the high engine speed setting are higher than the setpoint rotational speeds determined from the basic engine speed setting or those based on a combination of the basic engine speed setting and the high engine speed setting.

According to the invention, an engine speed setting in each case comprises a setpoint rotational speed range of the prime mover above a reciprocal transmission range of the continuously variable transmission.

The process according to the invention can be simply integrated into a multiplicity of different vehicle systems because the various engine speed settings, i.e. at least the basic engine speed setting, the low engine speed setting and the high engine speed setting can be adapted to the vehicle system with little effort and can be provided essentially detached from the higher-level selection of the desired speed of the invention. Then, the setpoint rotational speed can be determined to the desired extent on the basis of the vehicle-system-specific engine speed settings, taking into account the current operating state of the power hydraulics.

Furthermore, the consideration according to the invention of the relationship between the desired rotational speed and the individual reciprocating gear ratio applied in the area of the continuously variable transmission offers the advantage that the current load situation in the drive train of the prime mover is taken into account in the determination of the setpoint engine speed without further effort.

If the power hydraulics comprise booms and the setpoint rotational speed of the prime mover is determined as a function of an operating state of the booms, a current engine power or an engine power to be provided at a later point in time, which engine power has to be provided by the prime mover for a requested operation of the power hydraulics, can be determined in a simple manner.

In a further advantageous variant of the process according to the invention, a current operating state of the booms and/or an attached implement, such as a bucket of a wheel loader, is considered in the determination of the desired speed of the prime mover, if the power hydraulics comprises booms and an implement attached thereto. In this way, in a simple manner it is ensured that the engine speed is sufficiently high, for instance, during a penetration process of an implement designed as a bucket into a heap, to operate, for instance, a work machine designed as a wheel loader at the desired high productivity and to prevent a high load of the prime mover causing a so-called stalling of the prime mover during unfavorable courses of operating states.

In addition, it is also possible, as a function of the operating state of the power hydraulics, to guide the speed level of the prime mover or of a wheel loader to a level at which the fuel consumption of the prime mover is minimized and the prime mover can be operated at low fuel consumption as a function of the current operating state of the power hydraulics.

If a gradient of a change in the operating state of the booms and/or the attachment is considered in the determination of the desired speed of the prime mover, the speed of the prime mover can be increased within short periods of operation to the desired extent, when the systems detects that a high speed or power of the hydraulic system is required based on the gradient. In the present case, the term speed of the power hydraulics shall denote in each case a degree or a speed of a change of the operating state of the power hydraulics, including among other things a speed of raising or lowering a mast.

In a further advantageous variant of the process according to the invention, the determination of the setpoint rotational speed of the prime mover is performed as a function of an actual rotational speed of an output of the machine. The consideration of the actual rotational speed of the output in a simple way offers the option to determine or assess the probability of a wheel loader running into a heap and adjust the speed of the prime mover either to an advantageous value for a heap run or to transfer it to a low-consumption speed range of the prime mover.

If the setpoint rotational speed of the prime mover is determined as a function of the direction of travel of the prime mover, in particular during reverse travel of a wheel loader, a higher speed level of the setpoint rotational speed of the prime mover can be set in a simple manner, to achieve high operating speeds of the power hydraulics.

The setpoint rotational speed of the prime mover is determined in a further advantageous variant of the process according to the invention taking into account an engine load currently present at the prime mover, wherein the engine speed is increased as a function of the load information of the power hydraulics, if a high speed and/or power of the power hydraulics is advantageous in the current or future operating point of the machine. In addition, the load information is usually available within shorter operating periods than, for instance, information on the current direction of travel of the machine. Furthermore, the load information for the determination of the setpoint rotational speed is also available when movable components of the power hydraulics are currently not being adjusted. That is for instance the case when a mast of a wheel loader is stuck in the heap. Furthermore, the process according to the invention is then also applicable to vehicle systems that are equipped with power hydraulics that do not perform any motion. This is the case, for instance, for power hydraulics having a constant power input, such as a snow blower or the like.

Furthermore, measures to prevent the prime mover from stalling during unfavorable courses of operating state can be triggered or performed in a simple manner without having to run elaborate check routines for this purpose.

If a gradient of the power hydraulic load applied to the power hydraulics is used to determine the setpoint rotational speed of the prime mover, the engine speed can again be adapted within short periods of operation both to current and future operating state curves and a desired work result can be implemented to the desired extent.

In a further advantageous variant of the process according to the invention, the setpoint rotational speed of the prime mover is determined as a function of a transmission output torque present at a transmission output of the continuously variable transmission. This process can be used to compensate for a deviation between the actual transmission output torque and a requested transmission output torque, taking into account a current demand of the power hydraulics by adjusting the speed of the prime mover in the direction of a higher power output of the prime mover or in the direction of a more economical speed operating range of the prime mover in a simple manner.

If operating states of control elements of the power hydraulics are used to determine the target speed of the prime mover, the setpoint rotational speed of the prime mover can be adapted within short periods of operation to the extent necessary because load information of the power hydraulics is available before the information on the direction of motion of the power hydraulics or the loads actually present on the power hydraulics are available. Furthermore, information concerning the operating state of the power hydraulics is available even if there is currently no motion in the area of the power hydraulics.

In a further advantageous variant of the process according to the invention, a logic function is provided by weighting at least two variables of the operating state characterizing the operating state of the power hydraulics, wherein the result of the weighting result is used to determine the setpoint rotational speed of the prime mover by means of the low engine speed setting, by means of a combination of the low engine speed setting and the basic engine speed setting, by means of the basic engine speed setting, by means of a combination of the basic engine speed setting and the high engine speed setting or by means of the high engine speed setting. Such a logic function can also be used to prevent misinterpretations in a simple manner, which, for instance, cause an unexpected increase or decrease of the engine speed and increase fuel consumption of the engine to an undesirable extent or affect the current performance of the machine to an undesirable extent.

If a limitation of the gradient of the course of the setpoint rotational speed is provided in the determination of the setpoint rotational speed of the prime mover, abrupt changes in the speed of the prime mover adversely affecting drive operation and power mode of a machine to an undesired extent are prevented in a simple manner.

Such a gradient limitation can be configured in a simple manner and can be influenced by predefined parameters. In a particularly simple process, the gradients are stored software-based in the unit (rpm)/s, wherein the conversion into the corresponding gradient can again be performed software-based.

Both the features specified in the claims and the features specified in the exemplary embodiment of the subject matter of the invention below are in each case suitable to further develop the subject matter of the invention by itself or in any combination with one another. Gear load can be both the load on the input of the transmission and the load on the output of the transmission; furthermore, load can also denote either a torque or a power.

BRIEF DESCRIPTION OF THE DRAWINGS

Further advantages and advantageous embodiments of the subject matter of the invention will become apparent in principle from the claims and the exemplary embodiment described below with reference to the drawings.

In the drawings.

DETAILED DESCRIPTION OF THE PREFERRED EMBODIMENTS

Figure 1:
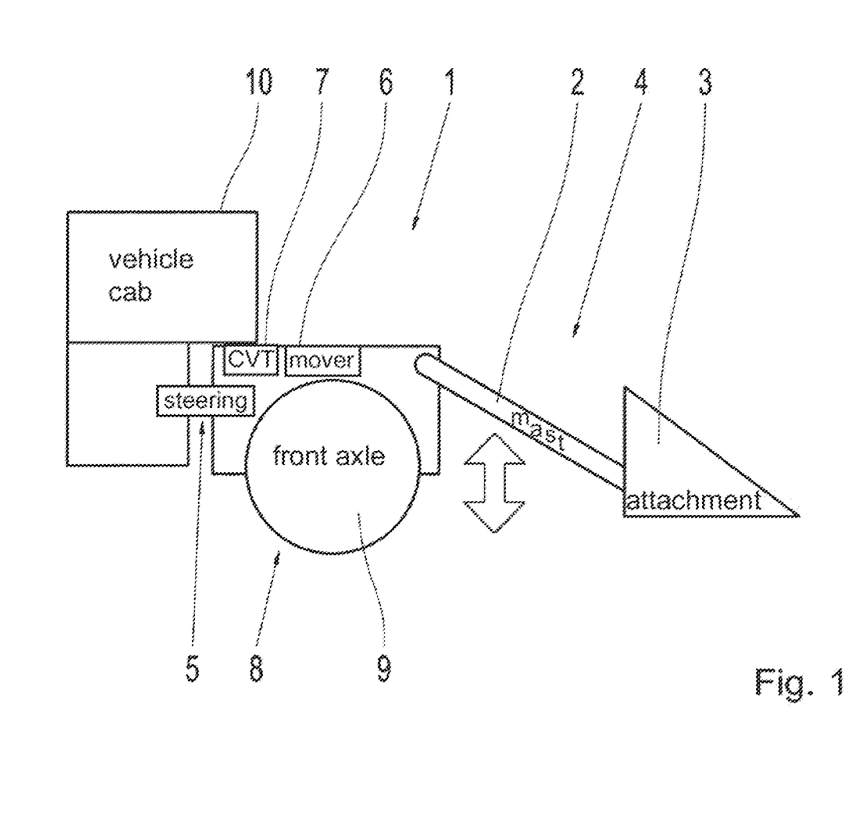
FIG. 1 shows a highly schematic partial side view of a work machine designed as a wheel loader, wherein a mast is in a lower position, whereas a bucket operatively connected thereto and designed as an attachment is arranged in a central position.

FIG. 1 shows a highly schematic representation of a wheel loader 1 having booms or a mast 2 and an attachment 3 of power hydraulics 4 designed as a bucket and operatively connected thereto. A drive train of the work machine 1 designed with an articulated steering 5 comprises a prime mover 6, a continuously variable transmission 7 and an output 8, wherein FIG. 1 only shows a front axle 9 of the output 8. A vehicle cab 10 is arranged above the articulated steering 5.

Figure 2:
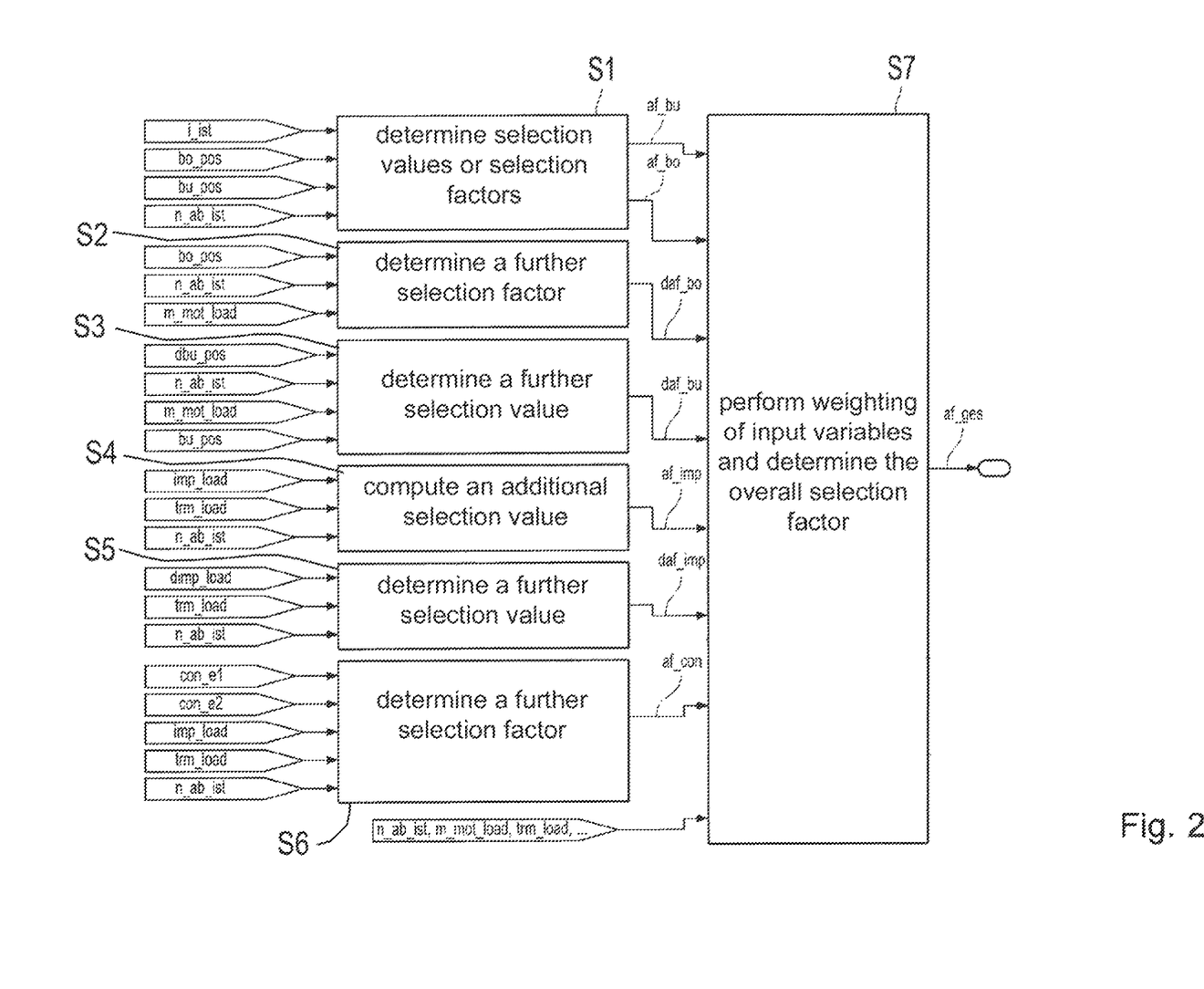
FIG. 2 shows a block diagram of a preferred variant of the process according to the invention.

FIG. 2 shows a block diagram of a process for determining an overall selection value af_ges, as a function of which a setpoint rotational speed of the prime mover 6 of the work machine 1, which is designed, for instance, as a wheel loader, is selected or determined in the manner described in more detail below. A setpoint rotational speed of the prime mover 6 can be selected depending on the driving situation and provided based on the procedure depicted by the block diagram of FIG. 2. For this purpose, a plurality of signals of different operating variables of the work machine 1 are evaluated, which are provided either in the area of a transmission control unit of the continuously variable transmission of the vehicle drive train of the work machine 1 itself or, for instance, via a so-called vehicle bus.

To be able to achieve a comprehensive functionality of the work machine 1 tailored to the specific situation, as many existing signals and operating variables as possible should be included in the evaluation of the driving state of the work machine 1 and considered in the implementation of the engine speed strategy.

In the work machine 1, the position, the state of motion and the power consumption of the individual components of the power hydraulics 4 are important indicators for determining the effective operating state of the work machine 1. Because various signals of operating variables of the work machine 1 as a function of the individual hardware-related design of the work machine 1 are not always available, a driving strategy cannot always be performed to the desired extent as a function of the currently existing operating state. Therefore, frequently a functional compromise is provided. In reality, this means that, for instance, an increased engine speed level of the rotational speed of the prime mover is set to ensure a productive operation of a machine, which, however, results in an increased fuel consumption of the prime mover of a machine.

In the process explained in more detail below, a desired rotational speed of the prime mover 6 of the wheel loader 1 is selected as a function of the current operating state of the wheel loader 1, taking into account the available information or known operating variables of the work machine 1 such that the required performance of the wheel loader as a function of the operating state is provided while simultaneously ensuring the lowest possible power consumption of the prime mover 6.

The wheel loader 1 is equipped with the matching sensor technology in the manner described in more detail below, to be able to determine the position and the state of motion of the mast 2 and the bucket 3 in addition to the power consumption of the power hydraulics 4.

To determine the setpoint rotational speed of the prime mover 6 of the work machine 1 to be set on an individual basis, in a first step S1, the actual ratio i_ist currently achieved in the continuously variable transmission 7, the position bo_pos of the booms 2, the position bu_pos of the bucket 2 and the actual rotational speed n_ab_ist of the output 8 of the wheel loader 1 are input as input variables. As a function of this information, two selection values or selection factors af_bo and af_bu are determined in the step S1, wherein the selection factor af_bo is determined as a function of the position bo_pos of the mast 2, whereas the selection factor af_bu is determined as a function of the position bu_pos of the bucket 3.

To be able to determine a further selection factor daf_bo, in a second step S2, a gradient dbo_pos of the course of the position bo_pos of the mast 3, the actual rotational speed n_ab_ist of the output 8 of the wheel loader 1 and a load m_mot_load, currently effective at the prime mover 6 of the wheel loader 1 are input as input values. During a third step S3, a further selection value daf_bu is determined, which is determined as a function of a gradient dbu_pos of the course of the position bu_pos of the bucket 3, of the actual rotational speed n_ab_ist of the output 8, of the engine load m_mot_load and of the position bu_pos of the mast 3.

In addition, during a further step S4, an additional selection value af_imp is computed as a function of a load imp_load currently effective at the power hydraulics 4, of a drive torque trm_load effective in the region of the output 8 of the wheel loader 1, and of the actual rotational speed n_ab_ist of the output. Furthermore, during a step S5, a further selection value daf_imp is determined as a function of a gradient dimp_load of the course of the load imp_load present at the power hydraulics 4, of the output torque trm_load, and of the actual rotational speed n_ab_ist of the output 8 of the wheel loader 1.

In addition, a further selection factor af_con is determined, during step S6, as a function of the operating states con_e1, con_e2 of the control elements of the power hydraulics 4, of the power hydraulic load imp_load, of the output torque trm_load and of the actual rotational speed n_ab_ist of the output 8.

The selection factors af_bu, af_bo, daf_bo, daf_bu, af_imp, daf_imp, af_con and further signals available via the vehicle bus, such as the actual rotational speed of the output n_ab_ist, the engine load m_mot_load, the output torque trm_load and the like are input as input variables into a logic function of a step S7 downstream of the steps S1 to S6 arranged in parallel to each other. In the area of step S7, a weighting of the input variables is performed and the overall selection factor af_ges representing the current operating state of the wheel loader 1 is determined. This overall selection factor af_ges is subsequently used to select the setpoint engine speed n_soll of the prime mover using the engine speed settings shown in FIGS. 3 to 5, i.e. the basic engine speed setting shown in FIG. 3, the low engine speed setting shown in FIG. 4 and the high engine speed setting shown in FIG. 5. In this case, the engine speed settings according to FIGS. 3 to 5 each represent speed ranges of the setpoint rotational speed n_soll of the prime mover 6, which are plotted over a reciprocal ratio i_rez of the continuously variable transmission i_rez.

Figure 3:
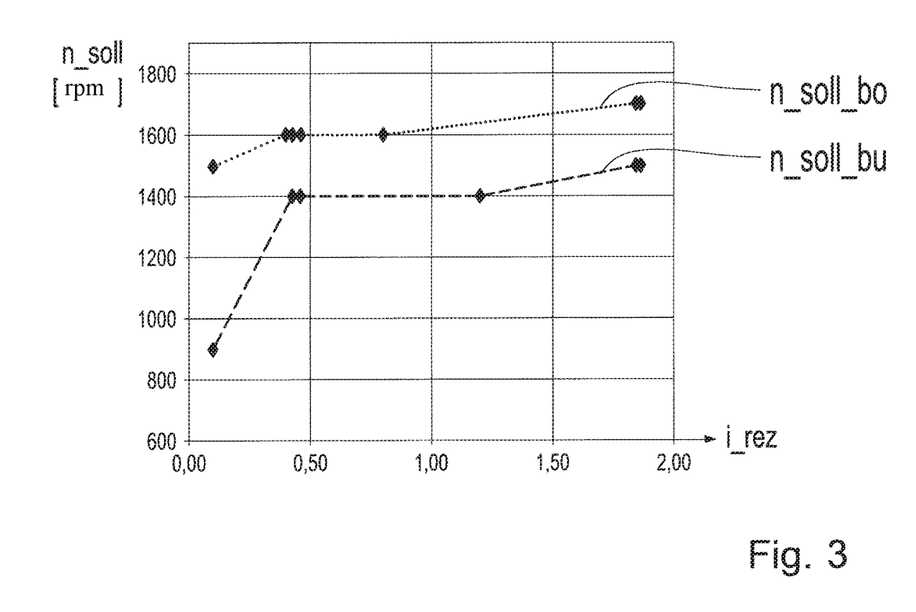
FIG. 3 shows a basic engine speed setting, by means of which a desired rotational speed of a prime mover of a work machine is selected as a function of different operating variables of the work machine.
Figure 4:
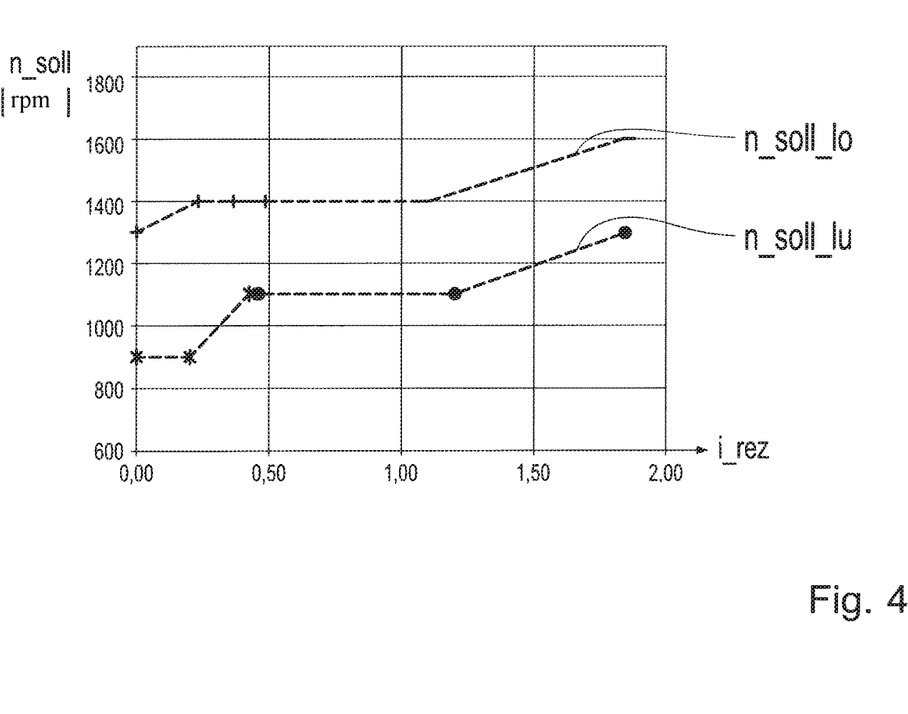
FIG. 4 shows a representation corresponding to FIG. 3 of a low engine speed setting, by means of which a setpoint rotational speed of the prime mover is selected in combination with the basic engine speed setting for a known operating state of power hydraulics of the prime mover.
Figure 5:
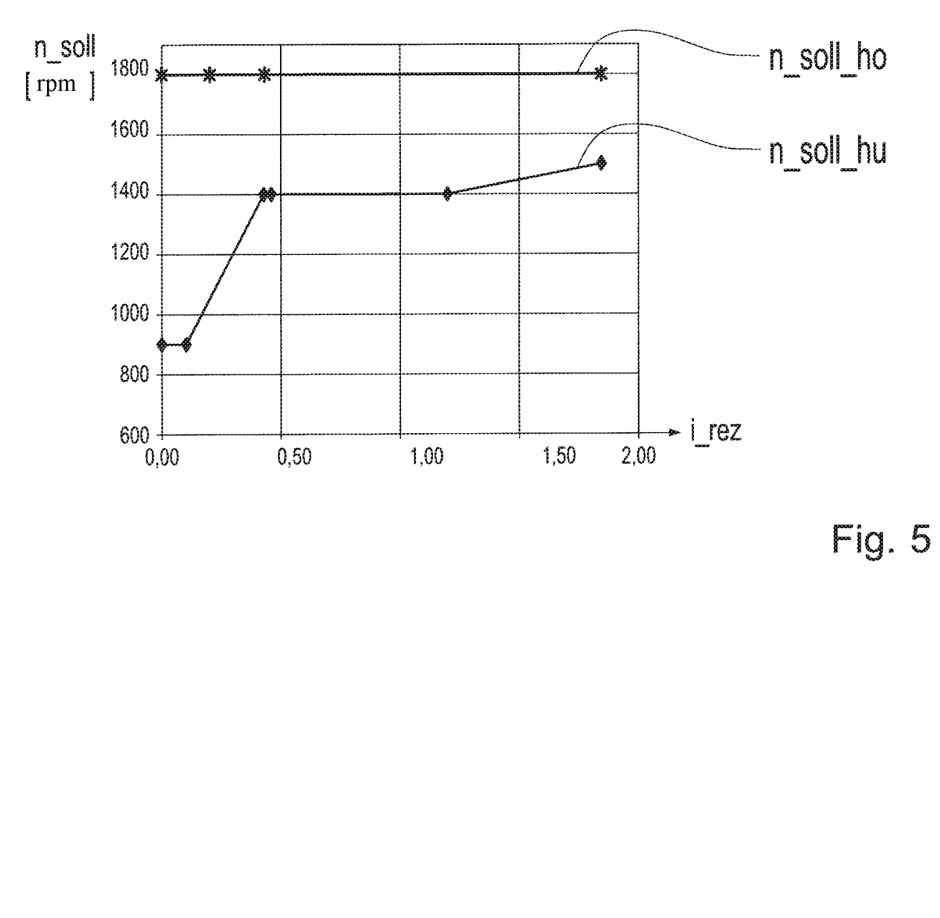
FIG. 5 shows a representation corresponding to FIG. 3 of a high engine speed setting, by means of which a desired rotational speed of the engine is selected in combination with the basic engine speed setting for a known operating state of power hydraulics.

The speed range of the basic engine speed setting is limited upwards by a characteristic curve n_soll_bo and downwards by another characteristic curve n_soll_bu, whereas the speed range of the low engine speed settings is limited upwards by the characteristic curve n_soll_lo and downwards by the characteristic curve n_soll_lu. To the same extent, the speed range of the high engine speed setting is defined upwards by the characteristic curve n_soll_ho and downwards by the characteristic curve n_soll_hu.

Figure 6:
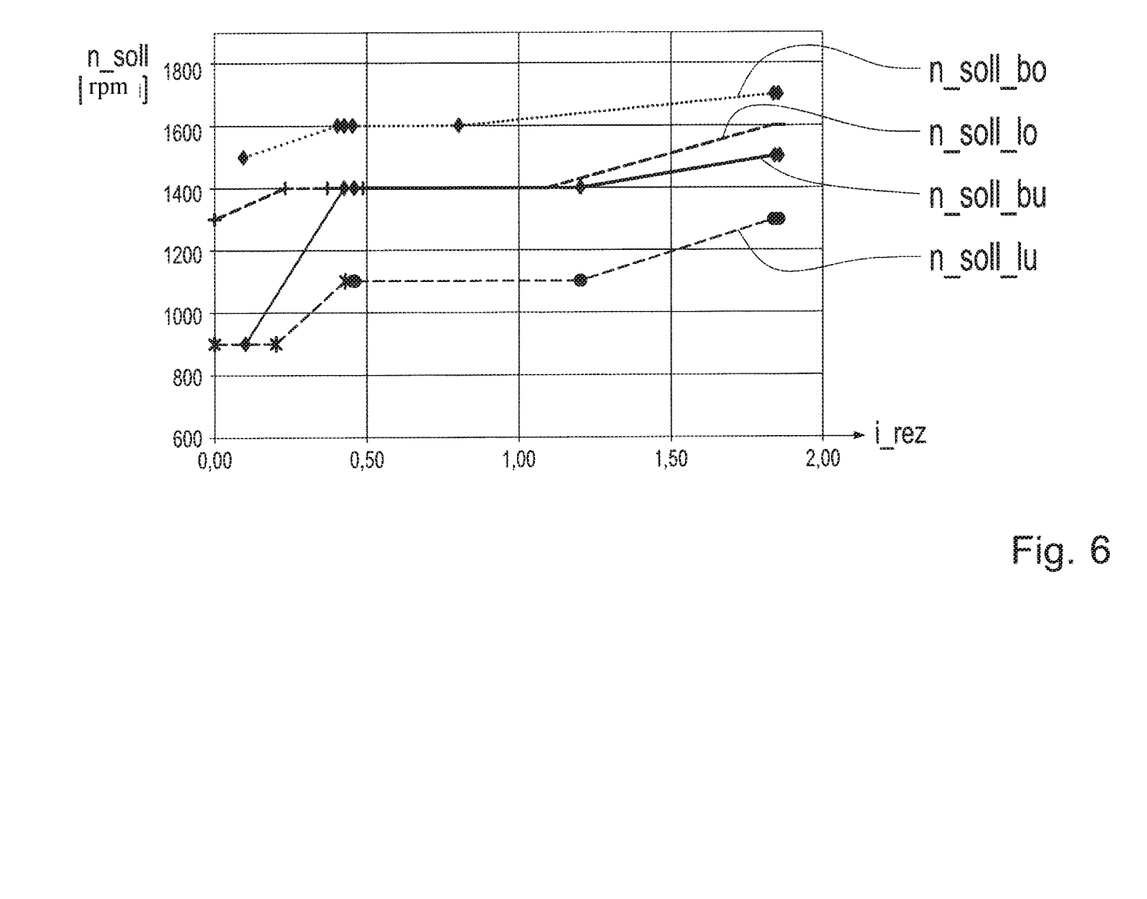
FIG. 6 shows a representation corresponding to FIG. 3 of a comparison of the basic engine-speed setting and the low engine-speed setting.

FIG. 6 shows a representation corresponding to FIG. 3, which include the characteristic curves n_soll_bo and n_soll_bu and the characteristic curves n_soll_lo and n_soll_lu. The comparison of the characteristic curves n_soll_bo and n_soll_bu of the basic engine speed setting and the characteristic curves n_soll_lo and n_soll_lu of the low engine speed setting shows that the speed range of the basic engine speed setting is substantially above the speed range of the low engine speed setting. In contrast, the speed range of the high engine speed settings in the presently considered exemplary embodiment is only partially above the engine speed range of the basic engine speed settings, to be able to increase the setpoint rotational speed n_soll of the prime mover 6 of the wheel loader 1 depending on the operating state-to a desired high level in the manner described in more detail below.

In the present exemplary embodiment considered in more detail, arbitrary values between 0% and 200% are determined for the overall selection factor af_ges as a function of the effective operating state of the work machine 1. For the functionality itself, it is immaterial that percentages are assigned to the overall selection factor af_ges. Therefore, depending on the individual application, there is also the option of assigning values from 0 to 2 or also values from 0 to x, where x can be any number >0, to the overall selection factor af_ges based on the operating state. In general, the use of percentages, taking into account the required storage space, offers significant advantages.

Furthermore, not all partial information listed in the description of FIG. 2 has to be known for the determination of the overall selection factor af_ges. If any of the aforementioned sub-information is not available, the logic function of step S7 determines the resulting overall selection factor af_ges from the partial information available. Thus, for instance, the information on the position bo_pos of the mast 2 is provided by a corresponding sensor system, but the operating state or the pivotal position bu_pos of the bucket 3 is not known due to a non-existent or defective sensor system.

Furthermore, a so-called gradient limitation is performed based on the logic function of step S7, which is designed to be applicable and is influenced by various parameters. By way of the application concept, for instance, the gradient of the change of the overall selection factor af_ges can be set directly based on the unit (rpm)/s and the conversion of the corresponding gradient of the overall selection factor af_ges can be performed software-based.

If the step S7 delivers values of the overall selection factor af_ges between 0% and 100%, the setpoint rotational speed n_soll of the prime mover 6 of the wheel loader 1 is determined taking the low engine speed setting and the basic engine speed setting into account. In this case, the setpoint rotational speed n_soll of the prime mover 6 is selected at a value of the overall selection factor af_ges=0 solely based on the low engine speed setting, whereas at a value of the overall selection factor af_ges=100%, the setpoint rotational speed n_soll is determined solely based on the basic engine speed settings.

In contrast, the setpoint rotational speed n_soll is selected within the range of 100% to 200% of the overall selection factor af_ges by a combination of the basic engine speed setting and the high engine speed setting. In this case, the setpoint rotational speed n_soll at a value of the overall selection factor af_ges=100% is again determined solely as a function of the basic engine speed setting and at a value equal to 200% solely based on the high engine speed setting.

For instance, for values of the overall selection factor af_ges between 0 to 100%, an easily implemented variant results in a linear interpolation between the low engine speed setting and the basic speed setting. This means that for determining the setpoint rotational speed n_soll for a value of the overall selection factor af_ges=10%, 90% is contributed by the basic engine speed setting and 10% by the low engine speed setting. The same process is used for values of the overall selection factor af_ges within the value range of 100% to 200%, where, for instance, for a value of the overall selection factor af_ges of 130%, 70% of the selection of the setpoint rotational speed n_soll are based on the basic engine speed setting and 30% are based on the high engine speed setting.

In general, the determination of the setpoint rotational speed n_soll of the prime mover 6 of the wheel loader 1 is based on the basic engine speed setting if the position bu_pos of the bucket 3 and the position bo_pos of the mast 2 indicate a heap run. FIG. 1 shows such a bucket position bu_pos and such a mast position bo_pos by way of example. Furthermore, the setpoint rotational speed n_soll is also determined on the basis of the basic engine speed setting if no information on the current operating state of the power hydraulics 4, i.e. its position, the effective load, the direction of motion and the like, is available. This ensures that the work machine 1 can be operated at high productivity, even if the subsystem information, which is preferably detected by sensors, is not available. This happens either in machines without appropriate sensors or when the sensors are malfunctioning.

The prime mover 6 of the work machine 1 is operated based on the basic engine speed setting at a high speed level, which can be used to achieve a high productivity using the work machine 1. In this case, the setpoint rotational speed n_soll determined in each case via the basic engine speed setting has a speed level at which a high operating hydraulic speed can be provided. The prime mover 6 is then operated in a speed range, in which it provides high power and is operated above a speed limit in particular for penetration of a pile of material, above which limit a negative impact on productivity and driving behavior is avoided and a so-called stalling of the prime mover is prevented.

In contrast, the prime mover 6 of the wheel loader 1 is operated at a significantly lower speed level if the setpoint rotational speed n_soll of the prime mover 6 is also determined as a function of the low-speed setting than for a selection of the setpoint rotational speed n_soll solely based on the basic engine speed settings. This results primarily in significant consumption advantages over the determination of the setpoint rotational speed n_soll solely using the basic engine speed setting.

The low engine speed setting is used alone or in combination with the basic engine speed setting for determining the desired engine speed n_soll, if driving situations are determined based on the additionally available information regarding the current operating state of the power hydraulics 4, in which engine speeds increasing the fuel consumption of the prime mover 6 are not imperative. In such operating state courses, the rotational speed of the prime mover 6 can be decreased to a reduced speed level without impairing the productivity of the work machine 1 and increasing the risk of the prime mover 6 being stalled. Irrespective of the above, however, the general operation of the prime mover 6 at a lowered speed level is not effective in most cases, because, for instance during reverse driving an increased speed level is essential to achieve high power hydraulic speeds and to move the mast 2 and the bucket 3 during withdrawal from the pile of material to a desired operating state or to a desired position within short periods of operation.

As the speed range of the high engine speed setting is at least sectionally higher than the basic engine speed setting, the productivity of the prime mover 6 can be increased further by determining the setpoint rotational speed n_soll of the prime mover 6 solely or additionally based on the high engine speed setting in comparison to a setpoint rotational speed n_soll determined solely based on the basic engine speed settings. The setpoint rotational speed n_soll, which is determined as a function of the high engine speed setting, is primarily used to operate the power hydraulics at maximum speed and thus maximum productivity of the prime mover 6.

In general, the high engine speed setting is then used for determining the setpoint rotational speed n_soll, if the effective determined load state of the power hydraulics 4 and/or the effective direction of motion of the power hydraulics 4 indicate that an increased speed of the prime mover 6 or engine speed is expedient.

The position signals bo_pos and bu_pos of the mast 2 and the bucket 3 are primarily used to determine the probability of insertion into a pile of material. In the first step S1, the selection factors af_bu and af_bo are formed on the basis of the subsystem information bo_pos and bu_pos, and the overall selection factor af_ges is determined in the subsequent step S7. The selection factors af_bu and af_bo take on values between 0 and 100% as a function of the particular individual operating state, the values being determined, for instance, on the basis of a relationship mapped by characteristic curves.

Alternatively, the determination of the selection factors af_bu and af_bo can also be based on other functional approaches instead of characteristic curves. A useful extension is the use of characteristic maps, which, for instance, allows the consideration of the actual rotational speed n_ab_ist of the output 8 when determining the setpoint rotational speed n_soll. This additionally provides the option of deactivating or scaling down the setpoint rotational speed n_soll during a reverse drive of the work machine 1 or above a speed threshold, for instance 25 km/h, because a run into a pile of material is very unlikely above such a vehicle speed.

If both the position bu_pos of the bucket 3 and/or the position bo_pos of the mast 2 indicate that the wheel loader 1 is likely to enter a pile of material, the rotational speed of the prime mover 6 will not be reduced. During such an operating state of the wheel loader 1, the setpoint rotational speed n_soll of the prime mover 6 is set at least to a level which corresponds to the speed level that can be determined solely based on the basic engine speed setting, wherein the overall selection factor af_ges then has a value ≥100%.

If the wheel loader 1 is in the operating state shown in FIG. 1, in which the mast 2 is in its lowermost position and in which the bucket 3 is pivoted completely downwards, values equal to 100% each are determined for the selection factors af_bu and af_bo. Then, in step S7 a value equal to 100% is likewise assigned to the overall selection factor af_ges if the further subsystem information provided also yields such a result.

Figure 7:
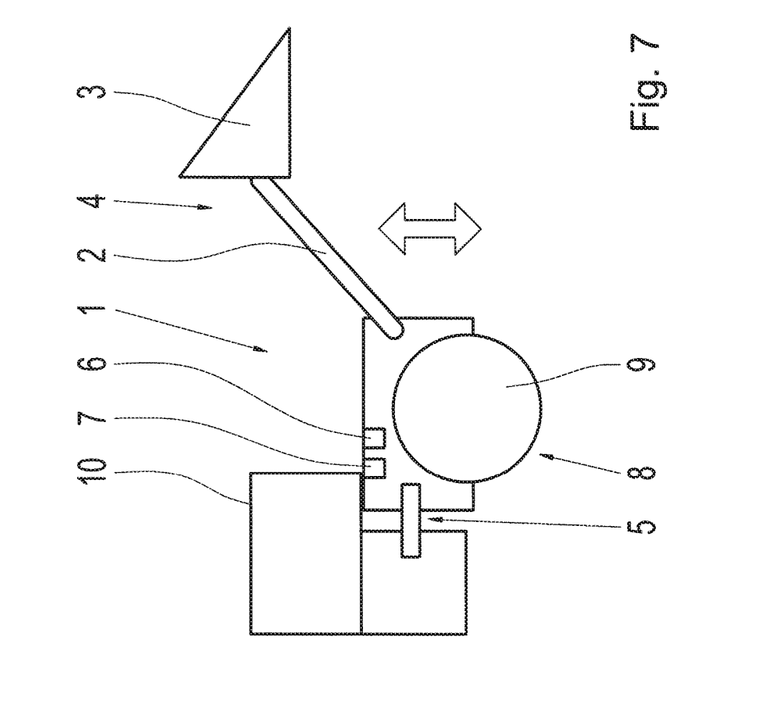
FIG. 7 shows a representation corresponding to FIG. 1 of the wheel loader, wherein the mast is in an upper position, whereas the bucket is in turn in the center position.
Figure 8:
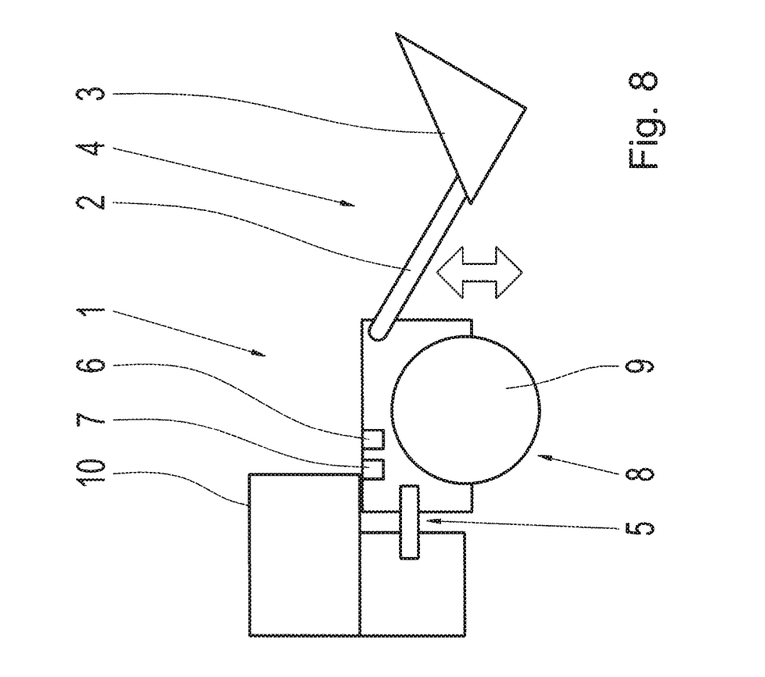
FIG. 8 shows a representation corresponding to FIG. 1 of the wheel loader where the mast is arranged in the lowest position and the bucket is fully tilted upwards.

In contrast, the setpoint rotational speed n_soll is brought to a low speed level when the power hydraulics 4 is in the operating states shown in FIGS. 7 and 8, in which states the probability of a run into a pile of material is very low. In such operating states of the power hydraulics 4, the setpoint rotational speed n_soll is set to a speed level within the speed range of the low engine speed setting, wherein the overall selection factor af_ges then has the value 0%.

The operating states of the power hydraulics 4 described last are present, for instance, when the mast 2 is arranged above a threshold value of the mast position bo_pos. In such operating states of the power hydraulics 4, the current position bu_pos of the bucket 3 is irrelevant for the determination of the overall selection factor af_ges, which is why the overall selection factor af_ges can then be set to 0% exclusively on the basis of this position.

If the bucket 3, for instance, in the extent shown in FIG. 8, is largely tilted or tilted far beyond its center position, the probability of a run into a pile of material is likewise set to 0 essentially independently of the currently present position bo_pos of the mast 2 and an overall selection factor af_ges equal to 0% is determined.

If a reduced probability for a run into a pile of material is determined on the basis of the position bu_pos of the bucket 3 and/or the position bo_pos of the mast 2, a reduced setpoint rotational speed n_soll is selected using the process described above and, if necessary, the speed of the prime mover 6 is reduced. This is achieved by determining speed values of the setpoint engine speed n_soll between the higher speed level of the basic engine speed setting and the lower speed level of the low engine speed setting based on an overall selection factor af_ges within the value range of 0% to 100%.

Figure 9:
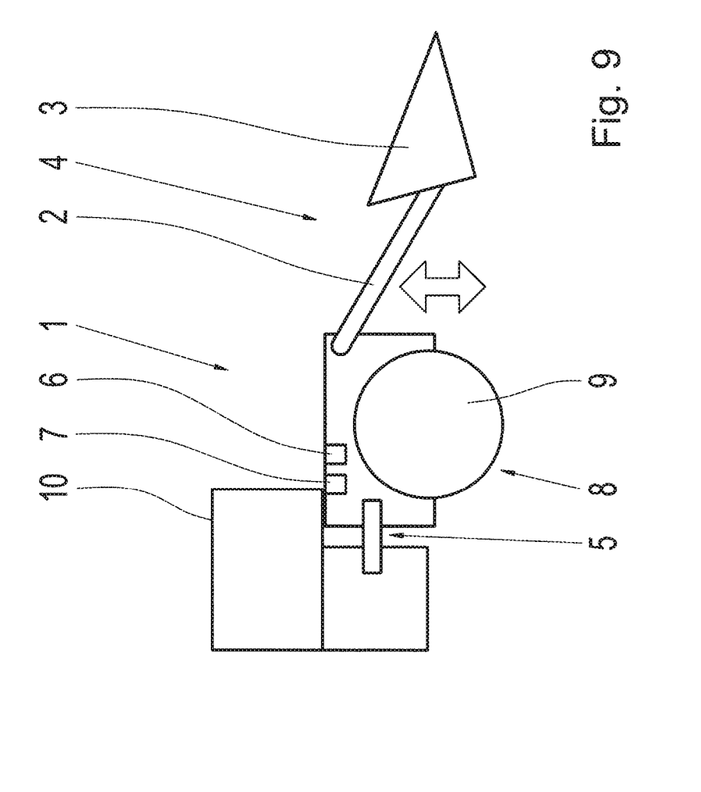
FIG. 9 shows a representation corresponding to FIG. 1 of the wheel loader, wherein the mast is in the lower position and the bucket is held in a not fully tilted position.
Figure 10:
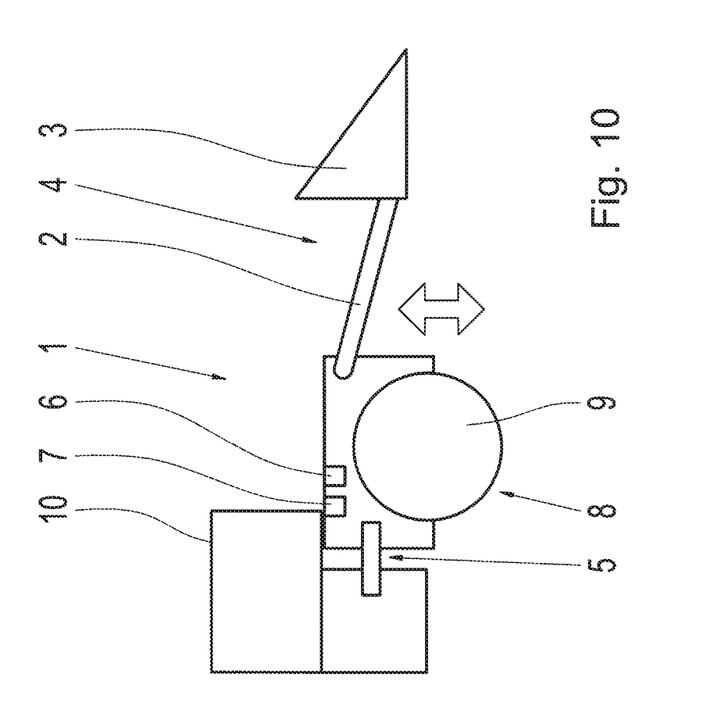
FIG. 10 shows a representation corresponding to FIG. 1 of the wheel loader, where the mast is lifted in comparison to the lower position of the mast and simultaneously the bucket is arranged in the central position.

Such operating states of the wheel loader 1 are shown, for instance, in FIGS. 9 and 10. There, the mast 2 of the power hydraulics 4 of the wheel loader 1 in the operating state of the wheel loader 1 and of the power hydraulics 4 shown in FIG. 9 is arranged in its lowermost position, whereas the bucket 3 is slightly titled from the center position shown in FIG. 1. In contrast, in the operating state of the power hydraulics 4 illustrated in FIG. 10, the bucket 3 is in its center position, but the mast 2 is in a slightly raised position compared to the lower position shown in FIG. 9.

In addition, the effective state of motion of the mast 2 and the bucket 3 can be used to select the desired speed n_soll of the prime mover. Thus, provision may be made that the engine speed is increased when the demand for a high speed of the power hydraulics or a high power of the power hydraulics is required and advantageous. For this purpose, the selection factors daf_bo and daf_bu are formed as a function of the subsystem information dbo_pos and dbu_pos, which are, among other things, used to determine the overall selection factor af_ges in step S7. The selection factors daf_bo and daf_bu can in turn assume values between 0 and 200%, as a function of the particular operating state of the power hydraulics 4. In turn, there is the option of determining the selection values daf_bo and daf_bu by means of characteristic curves or characteristic maps.

The use of characteristic maps in turn provides the option of reducing the setpoint rotational speed n_soll with increasing vehicle speeds. As a result, the algorithm underlying the approach described with reference to the drawing is less sensitive to vibrations of the power hydraulics. This applies in particular when a so-called ride control is active. In addition, further optional signals can be processed and based on the selection of the setpoint rotational speed n_soll when using characteristic maps.

The load m_mot_load effective at the prime mover 6, for instance, constitutes such a further optional signal. If further optional signals are taken into account in the selection of the setpoint rotational speed n_soll, unwanted changes of the overall selection factor af_ges and thus unwanted adjustments to the rotational speed of the prime mover 6 can easily be prevented. The use of the load information imp_load of the power hydraulics 4 can be used to increase the engine speed, if a high power hydraulic speed and/or power is/are advantageous.

The subsystem information or the measured power hydraulic load imp_load and the gradient dimp_load of the load imp_load applied to the power hydraulics 4 serve as the basis for the determination of the selection factors af_imp and daf_imp, which in turn is used to determine the overall selection factor af_ges. The selection factors af_imp and daf_imp can in turn take on any values between 0% and 200%, as a function of the effective operating state of the wheel loader 1 or the power hydraulics 4, wherein the determination of the selection factors af_imp and daf_imp can in turn be based on characteristic curves or characteristic maps.

The consideration of the subsystem information imp_load and/or dimp_load offers the option of performing the selection of the setpoint rotational speed n_soll of the prime mover 6 within short periods of operation, because the load information of the power hydraulics 4 is generally more readily available than the information about the direction of motion of the power hydraulics 4. Furthermore, the load information imp_load and dimp_load is also present when the power hydraulics 4 is currently not being moved. This happens, for instance, if the mast 2 is stuck in the pile of material or if the work machine 1 has power hydraulics 4, which do not perform any motion and are characterized by permanent power consumption. One example of such power hydraulics is, for instance, a so-called snow blower.

The determination of the setpoint rotational speed n_soll as a function of the effective operating states con_e1 and con_e2 of the control elements of the power hydraulics 4 in turn gives the option of increasing the speed of the prime mover 6 of the wheel loader 1, if a high speed and/or power of the power hydraulics is deemed to be advantageous on the basis of the operating states con_e1 and con_e2 of the control elements. For this purpose, the selection factor af_con is determined based on step S6, which in turn can take on any value between 0% and 200% and can be determined by means of characteristic curves or characteristic maps. If the operating states of the con_e1 and con_e2 are considered in the selection of the setpoint rotational speed n_soll, the selection of the setpoint rotational speed n_soll can again be performed within short periods of operation because the load information of the power hydraulics is available before the information on the direction of motion or the load of the power hydraulics 4 becomes available. Furthermore, the information relating to the operating states con_e1 and con_e2 of the control elements of the power hydraulics 4 is also available if currently there is no motion of the power hydraulics 4.

REFERENCE NUMERALS 1 work machine
2 mast
3 bucket
4 power hydraulics
5 articulated steering
6 prime mover
7 continuously variable transmission, CVT
8 output
9 front axle
10 cab
af_bu, af_bo selection value
af_con selection value
af_ges overall selection value
af_imp selection value
bo_pos Position of the mast or booms
bu_pos Position of the bucket or attachment
con_e1, con_e2 operating state of the control element of the power hydraulics
daf_bo, daf_bu selection value
daf_imp selection value
dbo_pos gradient of the course of the position of the mast
dbu_pos gradient of the course of the position of the bucket
dimp_load gradient of the course of the load applied to the power hydraulics
i_ist transmission ratio of the continuously variable transmission
imp_load effective load at the power hydraulics
i_rez reciprocal ratio of the continuously variable transmission
m_mot_load effective load at the prime mover
n_ab_ist actual rotational speed of the output of the prime mover
n_sol_lo upper limit of the speed range of the low engine speed setting
n_soll_lu lower limit of the speed range of the low engine speed setting
n_soll_bo upper limit of the speed range of the basic engine speed setting
n_soll_bu lower limit of the speed range of the basic engine speed setting
n_soll_ho upper limit of the speed range of the high engine speed setting
n_soll_hu lower limit of the speed range of the high engine speed setting
trm_load output torque

The invention claimed is:

1. A process for determining a setpoint rotational speed (n_soll) of a prime mover of a work machine, having a continuously variable transmission and power hydraulics, the setpoint rotational speed (n_soll) of the prime mover being determined, by a control unit or vehicle bus, based on an availability of information of an operating state of the power hydraulics, the setpoint rotational speed (n_soll) of the prime mover being used to operate the work machine, the method comprising:
- when information of the operating state of the power hydraulics is unavailable, determining the setpoint rotational speed (n_soll) as a function of only basic engine speed settings;
- when information of the operating state of the power hydraulics is available, determining the setpoint rotational speed (n_soll) as a function of either
  - a combination of the basic engine speed settings and one of a low engine speed setting and a high engine speed setting, or
  - one of the low engine speed setting and the high engine speed setting;
- the setpoint rotational speed determined as a function of the low engine speed setting alone being lower than the setpoint rotational speed (n_soll) determined as a function of either the basic engine speed setting alone or a combination of the low engine speed setting and the basic engine speed setting;
- the setpoint rotational speed (n_soll) determined as a function of the high engine speed settings alone are higher than the setpoint rotational speed (n_soll) determined as a function of either the basic engine speed setting alone or a combination of the basic engine speed setting and the high engine speed setting;
- plotting an engine speed setting comprising a setpoint rotational speed range (n_soll_bo and n_soll_bu, n_soll_lo and n_soll_lu, n_soll_ho and n_soll_hu) of the prime mover, as a function of a reciprocal transmission range (i_rez) of the continuously variable transmission;
- weighting, via a logic function, at least two operating state variables that characterize the operating state of the power hydraulics;
- determining, from a result of the weighting, the setpoint rotational speed (n_soll) of the prime mover as a function of one of:
  - the low engine speed setting,
  - the combination of the low engine speed setting and the basic engine speed setting,
  - the basic engine speed setting,
  - the combination of the basic engine speed setting and the high engine speed setting, and
  - the high engine speed setting; and
- controlling the rotational speed of the prime mover based on the determined setpoint rotational speed of the prime mover.

2. The method according to claim 1, further comprising determining the setpoint rotational speed (n_soll) of the prime mover as a function of the operating state of the power hydraulics, the operating state of the power hydraulics being an operating state (bo_pos) of booms of the power hydraulics.

3. The method according to claim 2, further comprising considering, during the determination of the setpoint rotational speed (n_soll) of the prime mover, a current operating state (bo_pos, bu_pos) of at least one of the booms and an attachment, which is connected to the booms, of the power hydraulics.

4. The method according to claim 2, further comprising giving consideration to at least one of a gradient (dbo_pos, dbu_pos) of a change in the operating state (bo_pos) of the booms and a gradient of a change in an operating state (bu_pos) of an attachment connected to the booms to determine the setpoint rotational speed (n_soll) of the prime mover.

5. The method according to claim 1, further comprising additionally determining the setpoint rotational speed (n_soll) of the prime mover as a function of an actual rotational speed (n_ab_ist) of an output of the work machine.

6. The method according to claim 1, further comprising additionally determining the setpoint rotational speed (n_soll) of the prime mover as a function of a direction of travel of the work machine.

7. The method according to claim 1, further comprising taking into consideration a motor load (m_mot_load) effective at the prime mover to determine the setpoint rotational speed (n_soll) of the prime mover.

8. The method according to claim 1, further comprising taking into consideration a hydraulic load (imp_load) effective on the power hydraulics to determine the setpoint rotational speed (n_soll) of the prime mover.

9. The method according to claim 1, further comprising taking into consideration a gradient (dimp_load) of a working hydraulic load (imp_load) effective on the power hydraulics to determine the setpoint rotational speed (n_soll) of the prime mover.

10. The method according to claim 1, further comprising taking into consideration either a transmission load of the continuously variable transmission or an effective transmission output torque (trm_load) to determine the setpoint rotational speed (n_soll) of the prime mover.

11. The method according to claim 1, further comprising taking into consideration operating states (con_e1, con_e2) of control elements of the power hydraulics to determine the setpoint rotational speed (n_soll) of the prime mover.

12. The method according to claim 1, further comprising providing a limitation of a gradient of a course of the setpoint rotational speed (n_soll) when determining the setpoint rotational speed (n_soll) of the prime mover.

13. A method of determining a setpoint rotational speed (n_soll) of a prime mover of a work machine, having a continuously variable transmission and power hydraulics, the setpoint rotational speed (n_soll) of the prime mover being determined, by a control unit or vehicle bus, based on operating state information of the power hydraulics, the method comprising:
- attempting to detect the operating state information of the power hydraulics with sensors of a sensor system;
- if the operating state information of the power hydraulics is unavailable, determining the setpoint rotational speed (n_soll) of the prime mover (6) based on basic engine speed settings and excluding consideration of a current operating state of the power hydraulics;
- if the operating state information of the power hydraulics is known, determining the setpoint rotational speed (n_soll) of the prime mover based on either:
  - a combination of the basic engine speed settings and one of a low engine speed setting and a high engine speed setting or
  - one of the low engine speed setting and the high engine speed setting;
- wherein the setpoint rotational speeds (n_soll) of the prime mover determined from the low engine speed settings alone is lower than the setpoint rotational speeds (n_soll) of the prime mover determined from either the basic engine speed setting or the combination of the basic engine speed setting and the low engine speed setting;

wherein the setpoint rotational speeds (n_soll) of the prime mover determined from the high engine speed settings alone is higher than the setpoint rotational speeds (n_soll) of the prime mover determined from either the basic engine speed setting or the combination of the basic engine speed setting and the high engine speed setting;

each of the low engine speed setting, the basic engine speed setting and the high engine speed setting being represented by a setpoint rotational speed range (n_soll_bo and n_soll_bu, n_soll_lo and n_soll_lu, n_soll_ho and n_soll_hu) of the prime mover plotting the setpoint rotational speed ranges as a function of a reciprocal transmission range (i_rez) of the continuously variable transmission;

weighting, with a logic function, at least two variables which correlate to the operating state of the power hydraulics;

further determining the setpoint rotational speed (n_soll) of the prime mover based on the weighting of the at least two variables and one of:
the low engine speed setting,
the basic engine speed setting,
the high engine speed setting,
the combination of the low engine speed setting and the basic engine speed setting, and
the combination of the high engine speed setting and the basic engine speed setting; and controlling the rotational speed of the prime mover based on the determined setpoint rotational speed of the prime mover.

* * * * *